United States Patent
Neagley et al.

(10) Patent No.: US 6,434,372 B1
(45) Date of Patent: Aug. 13, 2002

(54) LONG-RANGE, FULL-DUPLEX, MODULATED-REFLECTOR CELL PHONE FOR VOICE/DATA TRANSMISSION

(75) Inventors: Daniel L. Neagley, Albuquerque; Scott D. Briles, Los Alamos; Don M. Coates, Santa Fe; Samuel M. Freund, Los Alamos, all of NM (US)

(73) Assignee: The Regents of the University of California, Los Alamos, NM (US)

( * ) Notice: Subject to any disclaimer, the term of this patent is extended or adjusted under 35 U.S.C. 154(b) by 70 days.

(21) Appl. No.: 09/760,193

(22) Filed: Jan. 12, 2001

(51) Int. Cl.[7] .................................................. H03C 1/52
(52) U.S. Cl. ..................... 455/106; 455/107; 455/63; 340/10.4
(58) Field of Search ............................ 455/90, 63, 83, 455/550, 66, 73, 106, 107, 42, 129, 575, 574; 343/700 MS, 725, 729, 755, 761, 775, 779, 782, 836, 837; 340/10.4, 572.7; 370/310

(56) References Cited

U.S. PATENT DOCUMENTS

| | | | |
|---|---|---|---|
| 4,075,632 A | | 2/1978 | Baldwin et al. |
| 4,360,810 A | | 11/1982 | Landt ...................... 343/6.5 R |
| 4,849,767 A | * | 7/1989 | Naitou ........................ 343/745 |
| 5,649,296 A | | 7/1997 | MacLellan et al. ......... 455/38.2 |
| 5,825,329 A | * | 10/1998 | Veghte et al. ............. 340/572.1 |
| 5,873,025 A | | 2/1999 | Evans et al. .................. 455/63 |
| 5,903,826 A | | 5/1999 | Nowak ..................... 455/277.1 |
| 5,907,307 A | * | 5/1999 | Bickert et al. ............... 343/702 |
| 5,966,098 A | | 10/1999 | Qi et al. ...................... 343/702 |
| 5,995,052 A | | 11/1999 | Sadler et al. ................ 343/702 |
| 6,034,639 A | | 3/2000 | Rawlins et al. ............. 343/702 |
| 6,046,683 A | * | 4/2000 | Pidwerbetsky et al. .. 340/10.32 |
| 6,049,310 A | * | 4/2000 | Sadahiro ..................... 343/702 |
| 6,157,621 A | * | 12/2000 | Brown et al. ............... 370/310 |
| 6,249,256 B1 | * | 6/2001 | Luxon et al. ................ 343/702 |

OTHER PUBLICATIONS

John Greenwald, "Do Cell Phones Need Warnings", Time, Oct. 9, 2000.

* cited by examiner

Primary Examiner—Nay Maung
Assistant Examiner—Sonny Trinh
(74) Attorney, Agent, or Firm—Samuel M. Freund

(57) ABSTRACT

A long-range communications apparatus utilizing modulated-reflector technology is described. The apparatus includes an energy-transmitting base station and remote units that do not emit radiation in order to communicate with the base station since modulated-reflector technology is used whereby information is attached to an RF carrier wave originating from the base station which is reflected by the remote unit back to the base station. Since the remote unit does not emit radiation, only a low-power power source is required for its operation. Information from the base station is transmitted to the remote unit using a transmitter and receiver, respectively. The range of such a communications system is determined by the properties of a modulated-reflector half-duplex link.

20 Claims, 9 Drawing Sheets

LONG-RANGE, FULL-DUPLEX, MODULATED-REFLECTOR CELL PHONE FOR VOICE/DATA TRANSMISSION

STATEMENT REGARDING FEDERAL RIGHTS

This invention was made with government support under Contract No. W-7405-ENG-36 awarded by the U.S. Department of Energy to The Regents of The University of California. The government has certain rights in the invention.

FIELD OF THE INVENTION

The present invention relates generally to wireless voice/data transmission and, more particularly, to the use of modulated-reflector technology for long-range and/or short-range, full-duplex cell phone communications.

BACKGROUND OF THE INVENTION

In "Do Cell Phones Need Warnings" by Cathy Booth et al., Time, Oct. 9, 2000, it is stated that cell phone levels of radiation must be below the Federal Communications Commission's "specific absorption rate" ceiling which is a measure of the energy in watts per kilogram that one gram of body tissue absorbs from a cell phone indicating that there is a possible danger of using a cell phone.

A bidirectional communications link generally requires both a power transmitter and a receiver at each end of the link. Modulated microwave backscatter systems suitable for communications over tens of kilometers have been developed. The primary advantage of such systems is that bidirectional and high-bandwidth operation can be achieved with a conventional microwave transmitter and receiver at one end of the link, and a modulated reflector and microwave receiver at the other end of the link, there being no microwave energy generated by this end of the link. Transmission of standard monochrome video data requires a communications channel bandwidth of 4 MHz. However by using state-of-the-art video-compression techniques, it is possible to convey one image of standard video per second over a 5 kHz channel. Information rate capacity of modulated reflector channels depends upon antenna sizes, transmit power levels, background noise levels, distance between the ends of the link, desired picture quality, and other engineering tradeoffs.

In U.S. Pat. No. 5,075,632 for "Interrogation and Detection System" which issued to Howard A. Baldwin et al. on Feb. 21, 1978, a telemetering apparatus is described which includes a carrier wave generator which generates at least a single frequency RF signal, a transponder for receiving that signal and for amplitude modulating it in accordance with information selected for transmission, an antenna on the transponder for reflecting the amplitude modulated signal, and a receiver which is preferably located at the generator for processing the signal to determine the information carried thereby. There need be no large power source at the location of the transponder since no carrier signal is generated. Two or more transponder antennas may be interconnected into an array so as to receive and reflect a larger amount of carrier power. The carrier from the interrogator (carrier wave generator) can be beamed selectively to one or more transponders. Additionally, it is possible to get response from one transponder to two or more interrogators without interference by using different carrier frequencies where the frequency difference is outside of the modulation signal pass band. Baldwin et al. states that the carrier frequency Information can also be sent to the transponder unit from the interrogator by appropriately modulating the carrier sent from the interrogator, which could be performed in such as manner as not to interfere with the modulation superimposed on the reflected carrier signal at the transponder, for example, by using sufficiently separated modulation frequencies or by using different forms of modulation. Baldwin et al. states further that radio frequency transmitting and receiving antennas are well known to those skilled in the art, but no description of antennas suitable for this purpose is provided therein.

In U.S. Pat. No. 4,360,810 for "Multichannel Homodyne Receiver" which issued to J. A. Landt on Nov. 23, 1982, a similar modulated backscatter radio frequency identification system to that of Baldwin et al., supra. Both of these communication systems are half duplex or time-division full duplex, in that the interrogator to transponder communications using amplitude modulation are achieved during a certain time period, while transponder to interrogator communications are performed during another period of time.

Full duplex modulated-reflector communications links have been proposed for short-range applications, such as inventory control and livestock monitoring. For example, U.S. Pat. No. 5,649,296 for "Full-Duplex Modulated Backscatter System" which issued to John Austin MacLellan et al. on Jul. 15, 1997, describes a full duplex apparatus that can electronically update shelf-price labeling for use in retail sales. In such a system, both the interrogator and the transponder (or tag as the term is used in the '296 patent) can transmit continuously and during the same time period. The duplex communication system includes an interrogator which generates a first modulated signal by modulating a first information signal onto a radio carrier signal. This first modulated signal is transmitted to at least one remote tag of the system. The remote tag receives and processes the first modulated signal received at its antenna. A backscatter modulator uses a second information signal to modulate the reflection of the first modulated signal from the antenna, the reflected signal being a second modulated signal. The interrogator receives and demodulates the second modulated signal to obtain the second information signal. The antenna described in MacLellan et al. is a loop or patch antenna, and an inexpensive, short range, bidirectional digital radio communications channel is implemented. MacLellan et al. also teach the use of phase modulation of the carrier signal which would require a more complex radio receiver in the tag capable of detecting phase-modulated signals. This phase-modulated signal would be modulated and backscattered by the tag. Specific implementations of this embodiment could include binary-phase-shift keying in the downlink and frequency-shift keying in the uplink (the path which is reflected and modulated by a device), or binary-phase-shift keying in the downlink and amplitude modulation in the uplink.

A similar technology may be found in U.S. Pat. No. 5,873,025 for "Modulated Backscatter Wireless Communication System Having An Extended Range" which issued to James Gifford Evans et al. on Feb. 16, 1999. Evans et al. also discloses that the invention described is relevant to any radio system utilizing modulated backscatter in which the object is to extend the range of the uplink path.

Antennas for modulated reflectivity systems are designed for reflecting a portion of the energy from the interrogator. Cell phones, by contrast, use wire monopole antennas having small areas and, therefore, poor ability to reflect incident radiation. Moreover, the manner in which cell phones are utilized effectively prevents alignment of the antenna with an incoming carrier wave. In U.S. Pat. No. 6,034,639 for "Retractable Antenna For Portable Communicator" which issued to Roger R. Rawlins et al. on Mar. 7, 2000, a retractable antenna which includes an elongated cylindrical conductor enclosed by an elongated conductive sleeve is described.

Other antenna designs for cell phones include U.S. Pat. No. 5,995,052 for "Flip Open Antenna For A Communication Device" which issued to Robert A. Sadler et al. on Nov. 30, 1999, where a planar antenna and a ground plane at a chosen angle therewith set for optimal operation of the antenna for the frequency of the communication device is described. The conductive element also shields the antenna from the effects of the human body. U.S. Pat. No. 5,966,098 for "Antenna System For An RF Data Communications Device" which issued to Yihong Qi et al. on Oct. 12, 1999 describes a dipole antenna system which includes a first arm extending in a first direction and a second arm extending in a second direction that is not in the same line as the first direction. An electromagnetic coupler provides coupling between each dipole arm to establish a desired resonant bandwidth. Neither of these antenna designs is suitable for a modulated-reflectivity communications system.

U.S. Pat. No. 5,903,826 for "Extremely High Frequency Multipoint Fixed-Access Wireless Communications System" which issued to Richard Joseph Nowak on May 11, 1999 describes a directional antenna system for allowing access from a subscriber location to a fixed-access wireless communications system having a plurality of base-space stations which include a plurality of angularly spaced directional antenna facets each capable of receiving discriminately for a plurality of frequency sets two RF signals having orthogonal polarization. The antenna provides an angular coverage of 360°, one facet being focused on the basestation. The purpose of this antenna design is to provide a directional antenna for high frequency (approximately 30 GHz) operation that permits the subscriber to receive the best signal from a basestation which is not necessarily the closest base-space station; however, the directional antenna must be able to discriminate between which base-space station it is receiving the signal from if the base-space stations are all transmitting at the same frequency. The antenna is deployed in a cellular environment, and the performances of the signals received by the antenna facets are prioritized with the best performing facet being selected as the default facet. This manner of operation contemplates an antenna having a fixed, permanent spatial orientation. For bidirectional systems, the '826 patent teaches that each antenna facet may have a single component which functions both to receive and transmit, or may have separate receive and transmit components. Nowak also teaches a single antenna facet which is rotatable to a point in various directions. The resting point of the rotatable facet would be determined by the radio controller, and one of a finite number of spaced angular positions would be chosen, each position assuming the roll previously filled by one facet in the multi-facet array.

Accordingly, it is an object of the present invention to provide a long-range cell phone communications system which does not emit significant radiation in order to respond to a received signal.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the radio communications system hereof includes: (1) a stationary system including: (i) means for generating an airborne carrier frequency; (ii) means for generating an airborne radio communication; and (iii) means for receiving and demodulating a modulated, reflected airborne carrier frequency; and (2) a mobile unit including: (a) data input means capable of generating electrical signals; (b) a passive transponder which includes: (i) an antenna having gain in a plurality of directions for receiving the modulated carrier frequency; (ii) an impedance switch in electrical connection with the antenna for varying the impedance thereof; and (iii) means for receiving the electrical signals from the data input means and for varying the impedance of the impedance switch in response thereto, thereby modulating the carrier frequency by varying the reflectivity of the antenna to the carrier frequency; (c) a radio receiver for receiving the airborne radio communication from the means for generating an airborne radio communication and generating electrical signals therefrom; and (d) data output means in electrical connection with the radio receiver for receiving the electrical signals generated thereby and generating an observable signal therefrom; whereby two-way radio communication is established between the stationary unit and the mobile unit.

It is preferred that the data input means includes a microphone.

Preferably, the data output means includes a speaker.

Benefits and advantages of the present invention include a handheld cellular phone unit that: (1) operates with little power consumption, thereby permitting lengthy airtime and reduced battery weight; (2) operates with no active RF radiation emitted from the cell phone antennas, thereby reducing radiation exposure to users; (3) operates over commercially viable long distances; (4) reduces hazardous waste generation due to smaller battery requirements; and (5) reduces spark generation potential for use in explosive environments.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 6a is a graph of the gain-area product versus orientation for the six-sided stack antenna shown in FIG. 4 hereof, while

DETAILED DESCRIPTION

Briefly, the present invention includes a portable, long-range, full-duplex cell phone for voice/data transmission that utilizes modulated-reflector technology. The apparatus includes an energy-transmitting base station and remote units that do not emit radiation. Rather, the remote units use modulated-reflector technology to convey information to the base station by attaching information to a carrier wave originating from the base station and having radio frequency, RF, or higher frequencies; the range from 0.9 GHz to 30 GHz is contemplated. Since information from the remote unit to base station is transferred without the remote unit emitting radiation, only a low-power power source is required for cell phone operation. Information from the base station to the remote unit is transmitted using a transmitter at the base station and a receiver located in the remote unit. The range of such a communications system is determined by the properties of a modulated-reflector half-duplex link.

The range of a modulated-reflector system can be determined from the Radar Range Equation (RRE) as follows:

$$R_{max} \propto \left[ \frac{P_t G_t G_r \lambda^2 \sigma}{TL \left(\frac{S_o}{N_o}\right)_{min}} \right]^{\frac{1}{4}}, \text{ where} \qquad \text{Equ. 1}$$

$R_{max}$ is the maximum detection range (meters);

$P_1$ is the transmit power (watts);

G is the transmit and the receive antenna gain compared to an isotropic antenna (base-station antennas);

$\lambda$ is the wavelength of the transmitted power (meters);

σ a is the radar cross section of the portable unit (meters squared);

T is the equivalent thermal noise temperature at the input terminals of the receiver (K);

L is the loss factor that includes system, medium, and propagation losses; and $\frac{S_o}{N_o}$ is the signal-to-noise ratio (SNR) at the receivers output.

Antenna gain can be calculated from $$G = \frac{4\pi A \eta}{\lambda^2}, \qquad \text{Equ. 2}$$

where A is the aperture area (meters squared) and η is the aperture efficiency, which is typically between 0.6 and 0.8 for a planar antenna.

Figure 1:
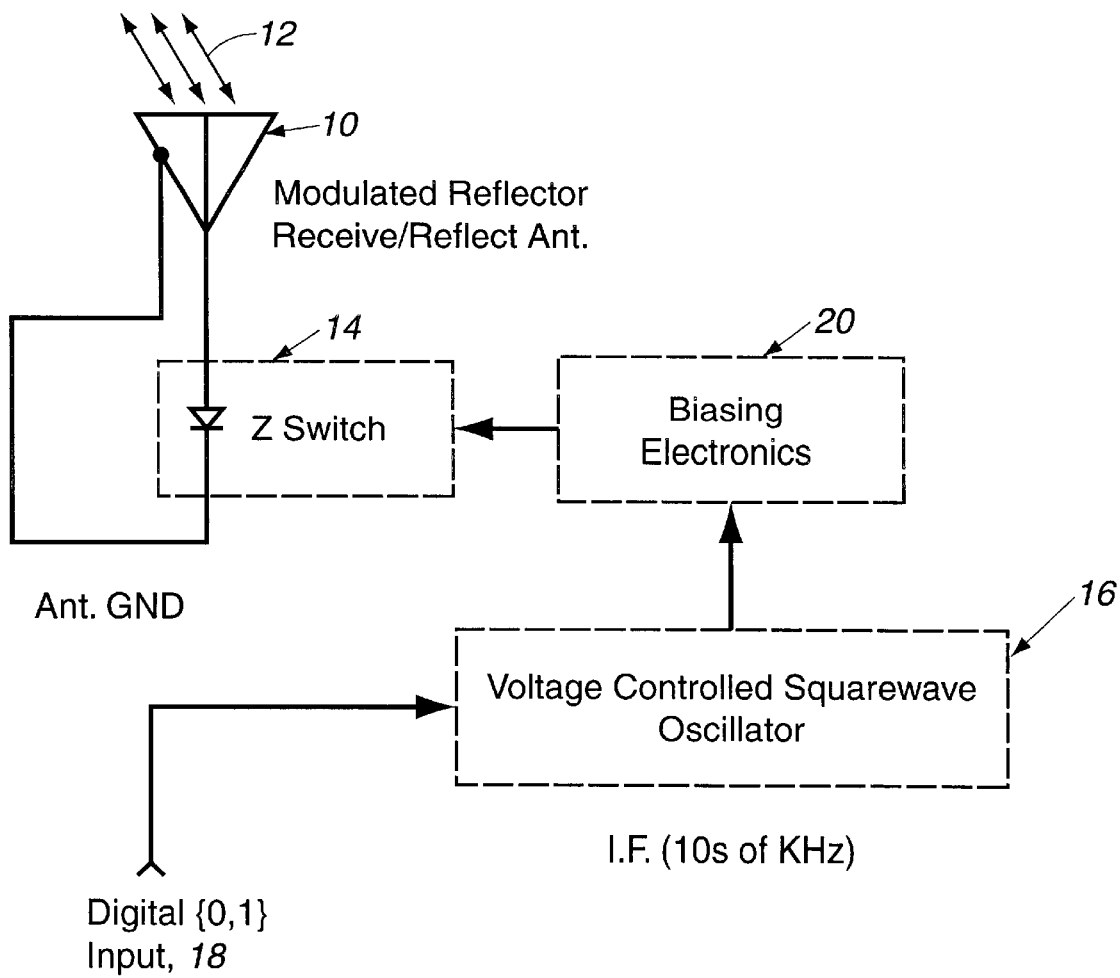
FIG. 1 is a schematic representation of a mobile, half-duplex modulation reflector remote unit.

Reference will now be made in detail to the present preferred embodiments of the invention which are illustrated in the accompanying drawings. Similar or identical structure will be identified using identical callouts. Turning now to FIG. 1, the basic principles associated with modulated reflection are illustrated. An antenna adapted to having its electrical impedance modulated in response to data input interacts with an impinging RF carrier wave. A single antenna is shown in the diagram. The plane of the antenna must be aligned perpendicular to the direction of the incoming carrier wave if significant reflection in the direction of the base station is to occur. However, for cell phone applications, reflectivity is required in many directions in order to render the orientation of the antenna less critical, and because the actual single direction in which reflection is required is not known. One way this can be achieved is by using a multi-faceted antenna, where at any given time the facet facing the carrier wave will be most effective in reflecting energy back to the transmitter. Another way to perform the same function is to rotate a single faceted or multi-faceted antenna at sufficiently high speed of rotation that the transmitted modulated signal will not be affected and many directions will be covered by the facets.

Shown in FIG. 1 is antenna, 10, onto which RF carrier wave, 12, from a remote base station impinges. Antenna 10 is electrically connected to an electronically controllable impedance switch, 14, which permits the impedance of the antenna to be rapidly varied. As an example, a PIN diode could be used to switch the antenna impedance between a large value and zero, where the closed circuit effectively grounds the antenna. Other devices, such as a ring mixer, can be used for impedance switching. The bandwidth of the switch determines the bandwidth of the modulation. Voltage-controlled oscillator (VCO), 16, provides a sine-wave or a square-wave which is responsive to digital input, 18. The source of the digital signal can be compressed digital audio, telemetry, etc., as examples. Both FSK modulation and analog FM modulation are possible. The frequency range of the VCO is such that appropriate IF frequencies are generated and such that the IF frequency can be switched sufficiently rapidly for the input-data rate. Biasing circuit, 20, provides the needed bias voltage and waveform shaping to insure proper operation of the impedance switch 14 in response to VCO 16.

When antenna 10 is illuminated with RF radiation from a transmitter of such radiation, the quantity of RF energy reflected in the direction of the source depends on the impedance experienced by antenna 10. The reflective characteristics of an antenna can thus be used to modulate the amplitude of a reflected radio frequency (RF) wave. Amplitude modulation (AM) is achieved by modulating the impedance of the antenna between an open circuit and a matched impedance load. If an ideal antenna is connected to an open-circuit, all the impinging energy is re-radiated by the antenna. By contrast, no energy is re-radiated from an antenna that is terminated with a load that is exactly matched to the antenna. If the load on the antenna is maintained between the limits of an open circuit and a matched load, then some of the impinging energy will be re-radiated and some will be absorbed.

Another form of modulation that can be introduced onto a RF wave is frequency modulation (FM). For FM, the modulated reflector must have its impedance controlled such that the phase of the reflected energy is modulated by the modulated antenna. By altering the terminating impedance of the modulated reflector between an open circuit and a short, the reflective carrier wave varies in phase between 180° and 0°; the modulating waveform is a square-wave and not a sinusoid. The rate of this variation between these two phases determines the modulating frequency. If frequency shift keying (FSK) is used to transmit a "m-ary", where m is any integer, sequence, each state is assigned a frequency, and m frequencies are used to transmit the sequence of symbols. At any given instance, the frequency of modulation corresponds to the m-ary symbol in the data sequence. Modulation and demodulation for this FM imposed on the carrier wave by the modulated reflector requires that the modulation frequencies of the FSK signal are above any frequency that could be produced by Doppler effects. Energy contained in the harmonics of the modulating frequency could be used to improve signal range by using harmonics in the frequency discrimination process. However, this addition of harmonics generally increases the bandwidth and decreases the signal-to-noise ratio. By using digital radio technology which employs frequency selective digital filters, several harmonics can be included in signal demodulation without including the noise in portions of the band where a harmonic is not present. For each frequency of the FSK modulation, a set of digital filters would be used to determine whether that frequency was being imposed on the carrier.

It should be mentioned that for modulation to be applied to a propagating electromagnetic wave only a change in relative wave-path potentials is required. Thus, the wave-path impedance is modulated, and a true earth ground is unnecessary since absolute potentials are not involved.

As stated hereinabove, the long-range cell phone communication system of the present invention includes two major subsystems in addition to the circuitry generally found in cell phones and other similar communication devices. First, a mobile handheld unit having a first antenna designed as a reflector for long-range modulated reflection, and a second antenna for receiving signals sent to the mobile unit. Voice compression and error-correcting hardware and software, a detector, processor, display, battery, keypad, speaker, microphone and a modulator control unit are also anticipated to be included in the cell phone.

A base station, or cell phone tower which in one embodiment has a first antenna for transmitting a carrier signal, a second antenna for receiving the weak reflected signal from the mobile unit, and a third antenna for transmitting a voice conversation signal to the mobile unit. The use of digital beam-forming (phased array), high temperature superconducting receiver circuits, digital radio reception, and digital-signal processing (DSP) are also contemplated, as are use of a transmitter, analog-to-digital converters, RF power splitters, amplifiers, and filters.

Figure 2:
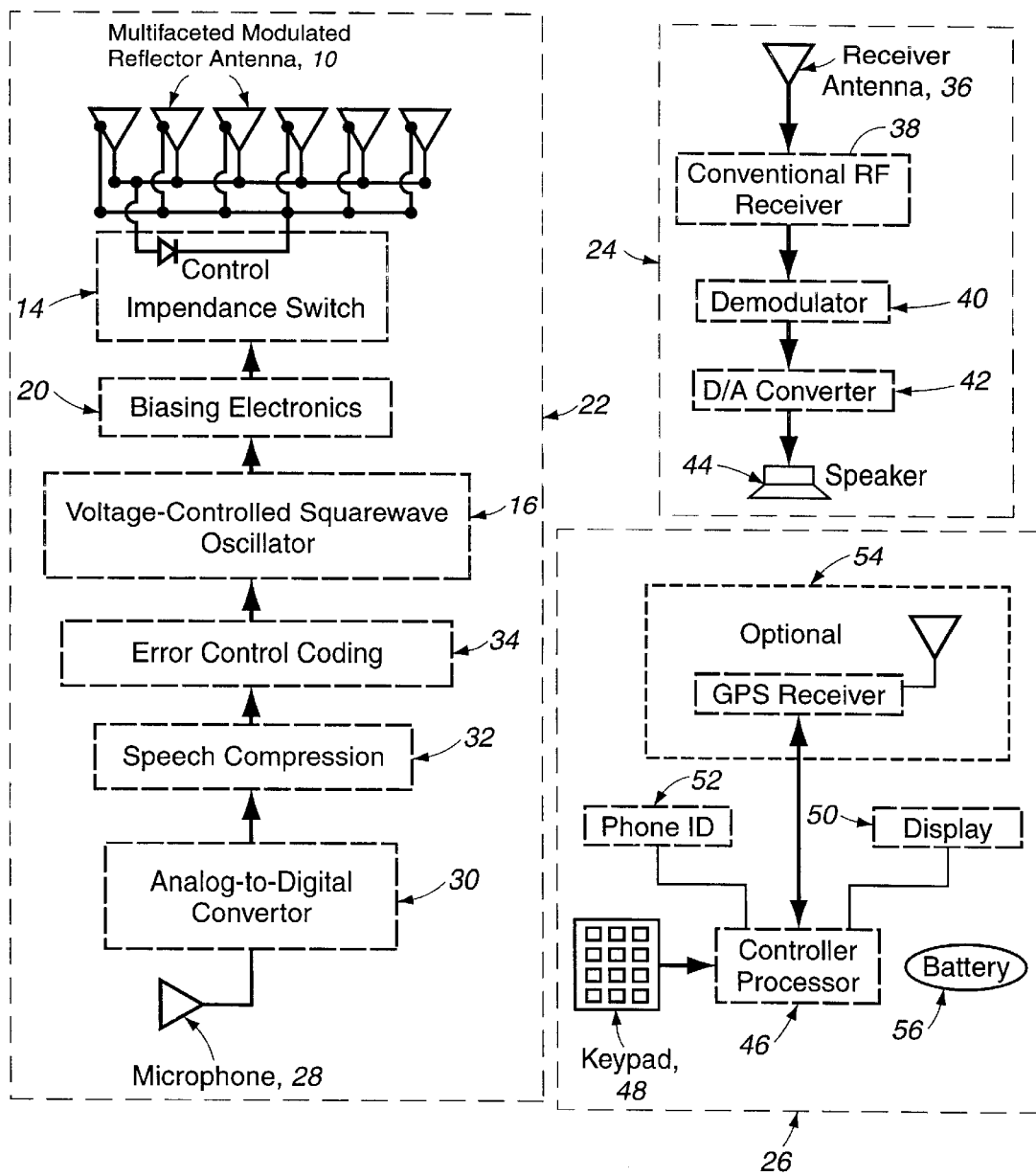
FIG. 2 is a schematic representation of the modulated antenna, receiver antenna and controller subsystems of a cell phone in accordance with the teachings of the invention.

FIG. 2 shows a preferred embodiment of a cell phone handset in accordance with the teachings of the present invention. Three subsystems are illustrated: modulated antenna subsystem, 22, which is similar to that shown in FIG. 1, hereof; incoming signal receiving subsystem, 24; and control subsystem, 26. Modulated antenna subsystem 22 includes impedance switch 14, VCO 16, and biasing electronics 20. In the cell phone of FIG. 2, digital input 18 of FIG. 1 includes microphone, 28, analog-to-digital converter, 30, and speech compression electronics, 32, and error control coding, 34, to reduce the bandwidth of the voice transmission. Receiver system 24 includes receiver antenna, 36, RF receiver, 38, demodulator, 40, digital-to-analog (D/A) converter, 42, and speaker, 44. Controller subsystem 26 includes controller processor, 46, keypad, 48, display, 50, phone identification (ID) circuitry, 52, and an optional global positioning system locator, 54.

A low-power battery, 56, powers all of the low current electronic circuits for the three subsystems. It should be mentioned that battery 56 is not required for transmitting voice or other data from the cell phone to the base station. This permits lengthy cell phone use time since transmission generally consumes between 80% and 90% of the battery power in a conventional cell phone.

With decreased electrical power requirements for electronic devices, a cell phone that could operate using solar cells and/or power extraction from the surrounding RF environment could be built.

Figure 3:
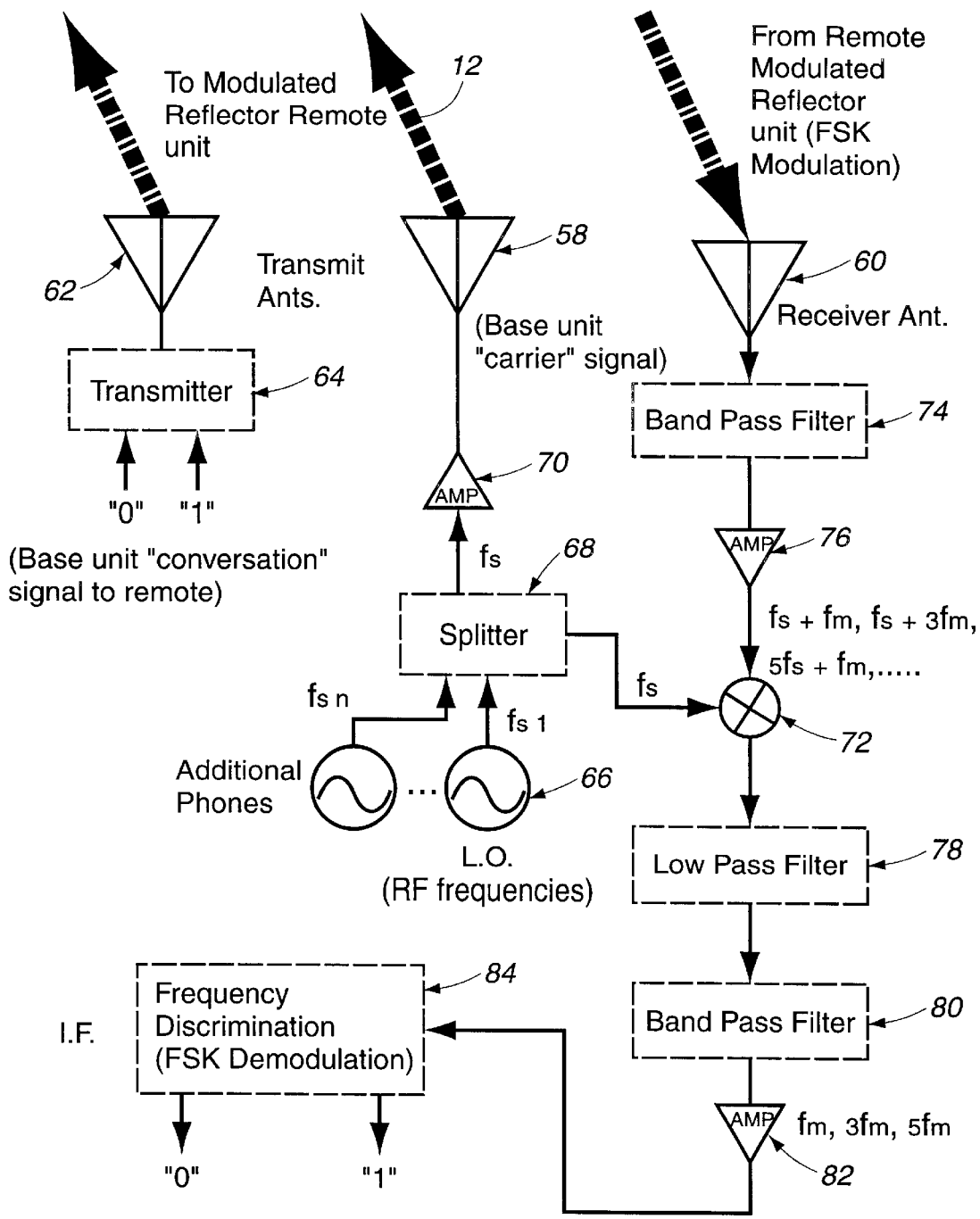
FIG. 3 is a schematic representation of one embodiment of a transmitter/receiver base station.

A bi-directional communications link that has a nonradiating mobile end can be implemented using modulated reflectors and an appropriately configured base station. FIG. 3 is a schematic representation of a base station configuration for the cell phone system of the present invention. Shown in FIG. 3 is a carrier wave transmitting antenna, 58, a receiving antenna, 60, for the modulated carrier wave generated by the remote unit, and a data transmitting antenna, 62, with transmitter, 64, for sending information to the remote unit which information is received by receiver antenna 36 thereof. Because only an small portion of the transmitted carrier wave power is ultimately returned to receiving antenna 60 at the active end of the link, coherent detection techniques are employed. For example, the output from local oscillator, 66, is divided using splitter, 68, and used with both amplifier, 70, as the transmitter oscillator to drive transmitter antenna, 58, and to mix with the modulated signal received by receiver antenna 60 which is used to detect and extract information sent from the passive end using mixer, 72.

There is a division between the tasks of transmitting a carrier wave and receiving the modulated reflected wave from the cell phone. However, local oscillator 66 generates a signal common to the two functions, assuming separate antennas. This is what enables the modulated reflector signal to be detected and demodulated using well known mixing procedures. Carrier transmitting antenna 58 emits a single carrier frequency. However, multiple carrier signals may be emitted at the same time to communicate with multiple cell units. Such a transmitting antenna must generate large amounts of RF power; electronically controlled gain is not needed. Local oscillator 66 provides the carrier frequency, or frequencies, for multiple modulated reflectors. Receiver antenna 60, by contrast, must process the low-energy signals that have been reflected from the modulated reflector. By dividing the generated carrier frequency (using splitter 62) such that the bulk of the energy is directed to the transmitting antenna, the receiver will be able to mix (using mixer 72) the received reflected, modulated carrier signal with the transmitted carrier frequency, the result being a baseband which allows for better reception of the reflected modulated energy and eliminates distortion upon down conversion. Electronically controlled gain and low-noise electronics are also employed to extract the low-energy signals. Before down-spectra conversion, the signal is filtered, 74, and amplified, 76, to allow the mixer to perform efficiently. Once the signal received from the modulated reflector is down-converted to base band in mixer 72, standard demodulation techniques are applied to the signal depending on the characteristics of the waveform. If square wave (FSK) modulation is used, the bandwidth should allow for multiple odd harmonics to be included in the demodulation process. This is achieved using filters, 78, and 80, and the amplified signal, 82, is analyzed using frequency discriminator/demodulator, 84.

For multiple remote cell phones to communicate with a single base station, additional complexity is involved. Each remote unit is assigned a different frequency that is close to their fundamental frequency. For example, for a 900 MHz system, several carrier frequencies may be radiated from the base station which differ by 100's of kHz. Another approach would be to use time-division multiplexing, where each remote unit would be assigned a portion of a period of time to communicate with the base station. Still another approach is where each cell phone tags data in a unique fashion or modulates the carrier at a unique rate.

It is desirable that the transmitter antenna direct a carrier wave at a remote unit. Clearly, the more directional this antenna is, the greater the range of communications. Several transmit antennas may be associated with a single base station in order to produce this gain (i.e., directionality). Although the receive antenna of the modulated-reflector link can use advanced digital signal processing (DSP) to increase its gain, adaptive beam forming technology can simulate an antenna of higher gain. Thus, real-time DSP can be used to direct a high-gain antenna pattern at the remote unit. A parameter of the RRE (Equ. 1) that is not associated with the transmitter/receiver is the radar cross section (RCS). This is conceptually the area of a flat-plate reflective surface that could replace the target and still reflect an equivalent amount of energy. In the case of the target being a modulated reflector, the RCS term can be replaced with an equation representing the appropriate amount of reflected energy. First, the modulated reflector is an antenna with an antenna-aperture cross section that accounts for energy captured. This is the RCS equivalent to a true flat-plate reflector. Since not all the captured energy will be available for modulation, the antenna efficiency must be included to account for this loss. The energy that is available for modulation is not totally modulated. There is a modulation efficiency associated with the modulated reflector that is typically 0.60. The modulated energy is then radiated by the antenna and thus the antennas gain must be taken into account. This leads to the following equation for the RCS of a modulated reflector:

$$\sigma = A \eta G_{mod\ reflector} \eta_m,$$ Equ. 3 where $\eta_m$ is modulation efficiency.

Substitution of Equ. 2 and Equ. 3 into Equ. 1 yields a formula that can be used to determine the maximum distance that a modulated-reflector communications system can operate. The bandwidth of the communication system is taken into account in the B term of the original RRE. From Equ. 1, it is seen that the smaller the bandwidth, the greater the range.

Another factor to consider is receive-input noise temperature, T. This factor depends on the wavelength used, but a conservative estimate of its value would be 290 Kelvin. By using high-temperature superconducting technology, this noise temperature can be reduced to yield a greater communications range. The noise figure and total loss, which have the same impact as temperature, can be conservatively estimated as having a value of 8 dB and 6 dB, respectively.

Acceptable values to use for SNR which appears in the denominator of Equ. 1 will be different between a radar ranging application and a communications link application. In radar range a value of 0 dB for SNR is acceptable. However, for a communications system where a signal must be demodulated, an acceptable value is 3 dB. This 3-dB value relies on a digital communications link and error-correcting coding being included in the digital stream.

The numerator of Equ. 1 shows that the gain of the transmit/receive (T/R) antenna is highly influential, as is the carrier wavelength, $\lambda$. Currently, cellular communications operate at 900 MHz frequency (~333 mm wavelength) and 2.4 GHz. Examining Equ. 1 in combination with Equ. 2, shows that the range increases as the wavelength decreases (i.e., as frequency increases). However, above 10 GHz, losses increase due to atmospheric effects. For a given operating frequency, the maximum range of the communications link is dependent on the transmit power, and the area of the T/R antenna and the modulated reflector antenna. Assuming a small-modulated reflector antenna, a suitable value would be 6 in$^2$. Assuming the T/R antenna would be mounted on a tower, a 6-ft-by-6-ft square antenna area would be feasible. The relationship between transmit power and maximum communication range can be evaluated graphically using the values given above to completely evaluate Equ. 1. If the intended communication is voice, then a realistic bandwidth would be 2400 Hz for compressed telephony.

Each of the two half-duplex communications links in accordance with the present invention has a different range limitation. The half-duplex information link from the base station to a remote unit is a standard transmitter/receiver link and as such is governed by familiar power/range requirements. The half-duplex information link from a remote unit to the base station is a modulated-reflector link. As a modulated-reflector link, energy must perform a round-trip journey (base station to remote unit to base station) to relay information. This modulated-reflector link will most likely require greater origination power than the other half-duplex link. However, the modulated reflector link is capable of achieving useable ranges with common transmit-power levels. For example, ½ kW of transmit power for 900-MHz voice communications would have a maximum range of approximately 6 km. Such a range could support a communications cell.

The communication link between the remote unit and the base station is established under two operational scenarios depending on the initiator of the link. If the base station (that is, another user connecting to the base station) is to establish the communications link, the conventional radio receiver (callout 26 of FIG. 2) of the remote unit would first be contacted. The remote unit would then modulate its reflectors in order to exchange information with the base station. The base station would continuously perform a search by altering its antenna beams to maximize the signal from the remote unit requesting service. Information exchange between the base station and the remote unit would then complete the communications link. If the remote unit is to establish the communications link, the remote unit would first modulate its reflectors in a narrowband manner. The base station, which would always be scanning for access-requesting remote units, would detect and demodulate energy reflected from the remote unit to begin the process of establishing a more efficient communications link. The conventional transmit/receiver radio link between the base station and the remote unit would again be used to complete the communications link.

As shown in FIG. 3, the base-station has two antennas for the modulated-reflector link, a transmit antenna 62 and a receive antenna 60. The transmit antenna directs a carrier wave at a remote unit. The more directional this antenna is, the greater the range of communications. Antenna gain can be adjusted directionally (i.e., steering of the antenna's beam or main lobe) without physically moving the antenna. This beam steering technology is known as phased-array antenna technology or in a more general sense beam forming technology. Phased-array antenna technology allows for the greatest gain of transmit and receive antennas, which are located at the base-station, to be electronically steered at the remote unit. This steering of the gain for both antennas greatly increases the maximum operational range of the modulated-reflector communications link. By adjusting the phase path of individual antenna elements, the transmitted signal can be electronically scanned or directed without the involvement of mechanical motion. The reception of the modulated-reflected energy is greatly enhanced by allowing the phase difference from individual antenna elements to be altered using digital signal processing. This, in effect, creates antenna gain that can be adaptive and controlled for several different remote units.

The maximum antenna gain for the modulated reflector communications link occurs when one of the antennas of the link is oriented normal to the carrier wave transmitting antenna. Similarly, performance will be below this maximum when no antenna of the structure is normal to the transmitting antenna. The design of the modulated-reflector antenna must provide for directionality when the direction to the base station is unknown. In order to achieve this directionality, a multi-faceted antenna system has been designed which has gain in all directions. Since no energy is being transmitted by the modulated reflector and the impedance of several individual antennas can be controlled by a single diode, the modulation of several individual antennas does not degrade of the system in comparison to a single antenna design. A multifaceted antenna then, provides the remote modulated-reflector with gain over 360°.

Figure 4:
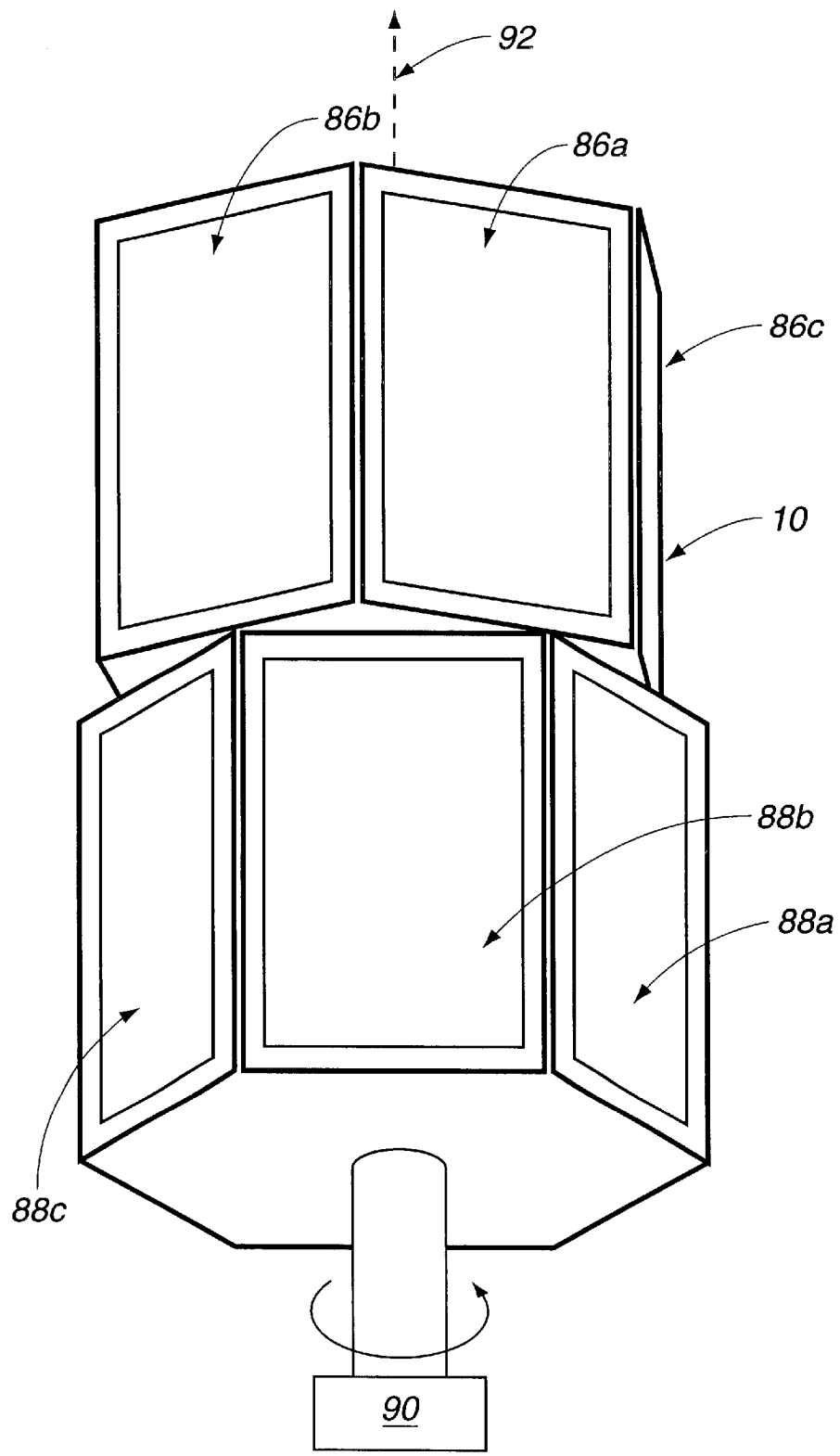
FIG. 4 is a schematic representation of a six-sided embodiment of an antenna suitable for modulated reflection of a carrier wave.

FIG. 4 shows a schematic representation of multifaceted antenna design suitable for cell phone use. Facets, 86a–86c, and 88a–88c, are three of six facets in each of the two stages of the antenna illustrated in FIG. 4. Each of the facets is placed in parallel electrical connection with the other facets and is modulated using the impedance switch 14 shown in FIG. 2 hereof. The combination of two six-sided structures, one stacked upon the other and rotated with respect to each other by 30°, reduces decreases in the gain of a single, six-sided antenna structure. Thus, the normal face of one structure is located between two closely aligned faces of the structure above or below it and, as will be shown hereinbelow, a more uniform antenna gain is presented to the transmitting antenna. It should be mentioned at this point that since the stages are shown to have different dimensions, one stage can be rotated with respect to the other and the pair of stages collapsed for storage, forming thereby a compact, nested structure. Additionally, the entire structure can be rotated about its axis in order to reduce the dependence of antenna gain on antenna orientation. Also shown in FIG. 4 is means, 90, for rotating antenna 10 about its axis, 92.

Figure 5:
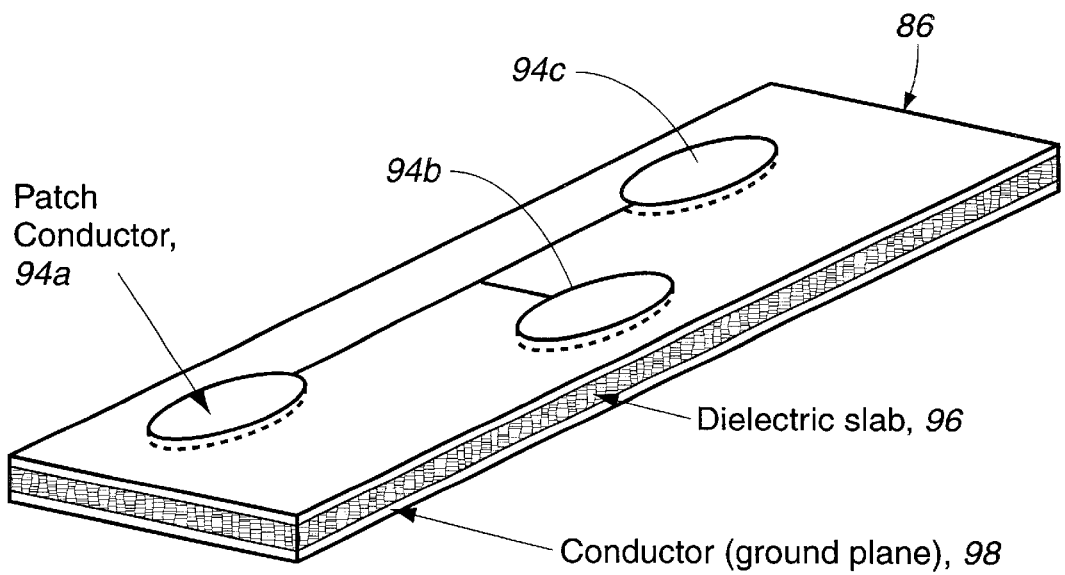
FIG. 5 is a schematic representation of a microstrip patch antenna embodiment of the polygonal, multi-faceted modulated reflector antenna of the present invention shown in FIG. 4 hereof, where each facet of the antenna includes at least one patch antenna.

FIG. 5 is a schematic representation of a microstrip resonant-cavity patch antenna embodiment of the multi-faceted modulated reflector antenna of the present invention. Shown are patch conductors, 94a–94c, which are located on a dielectric slab, 96, in contact with ground-plane conductor, 98, which extends beyond the patch. The patch surface and the ground plane surface are generally fabricated from gold alloy or copper alloy, and each microstrip represents a face (86 or 88) of the multi-faceted antenna shown in FIG. 4 hereof. Depending on the frequency of interest and the material's dielectric constant at that frequency, the dielectric layer's thickness determines the size of the etched patches and the gain of the antenna. Materials with a dielectric constant of $\geq 2$ for the frequencies of interest are common. For example, Polystyrene has an approximate dielectric constant of 2.5 for a frequencies between 2 and 4 GHz. By contrast, the ceramic material, Coors Al-200 has an approximate dielectric constant of 8.8 at a frequency of 2.4 GHz. The dielectric material can also be used to determine the thickness of the microstrip patch antenna or the size of the antenna. Frequencies of operation between 900 MHz and 2.4 GHz require a patch size of approximately 2.5 cm. From this, the size of the antenna can be determined.

Figure 6A:
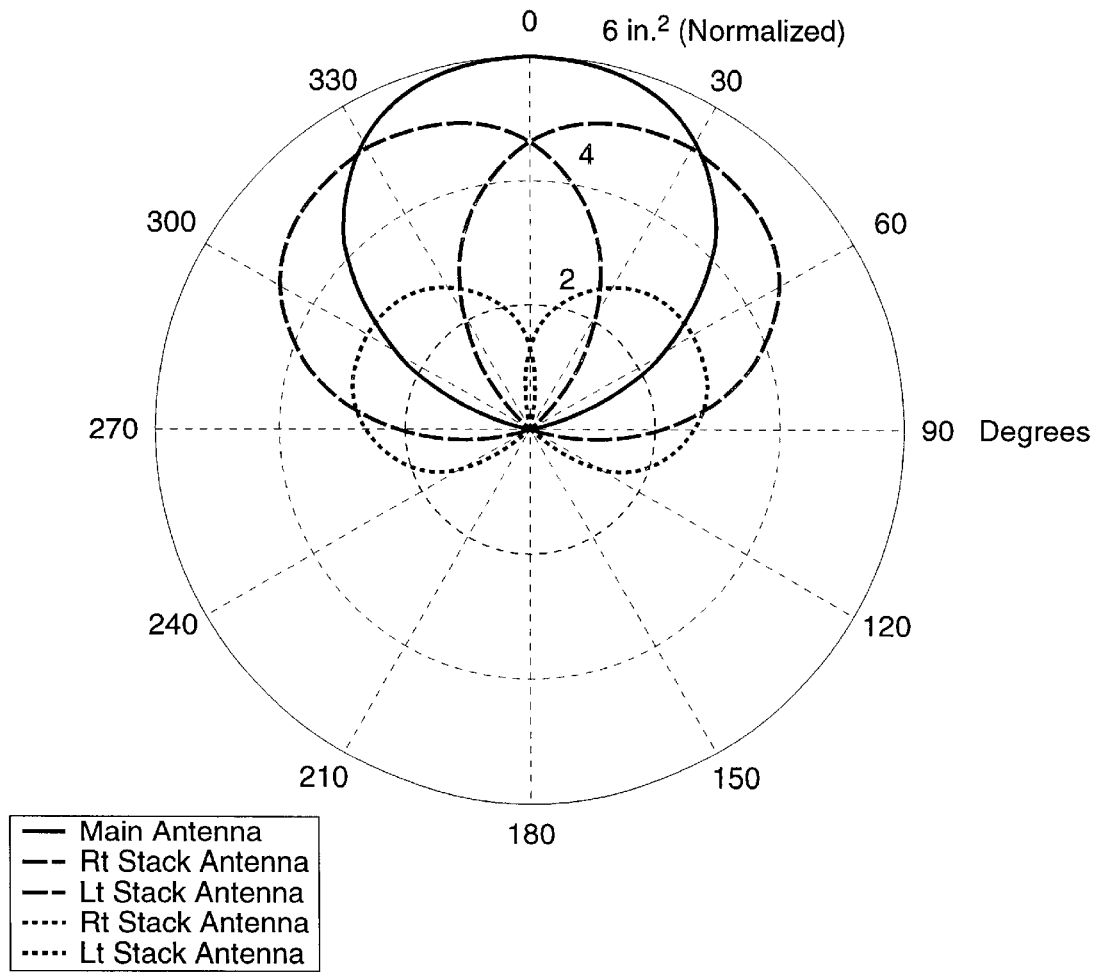
Figure 6B:
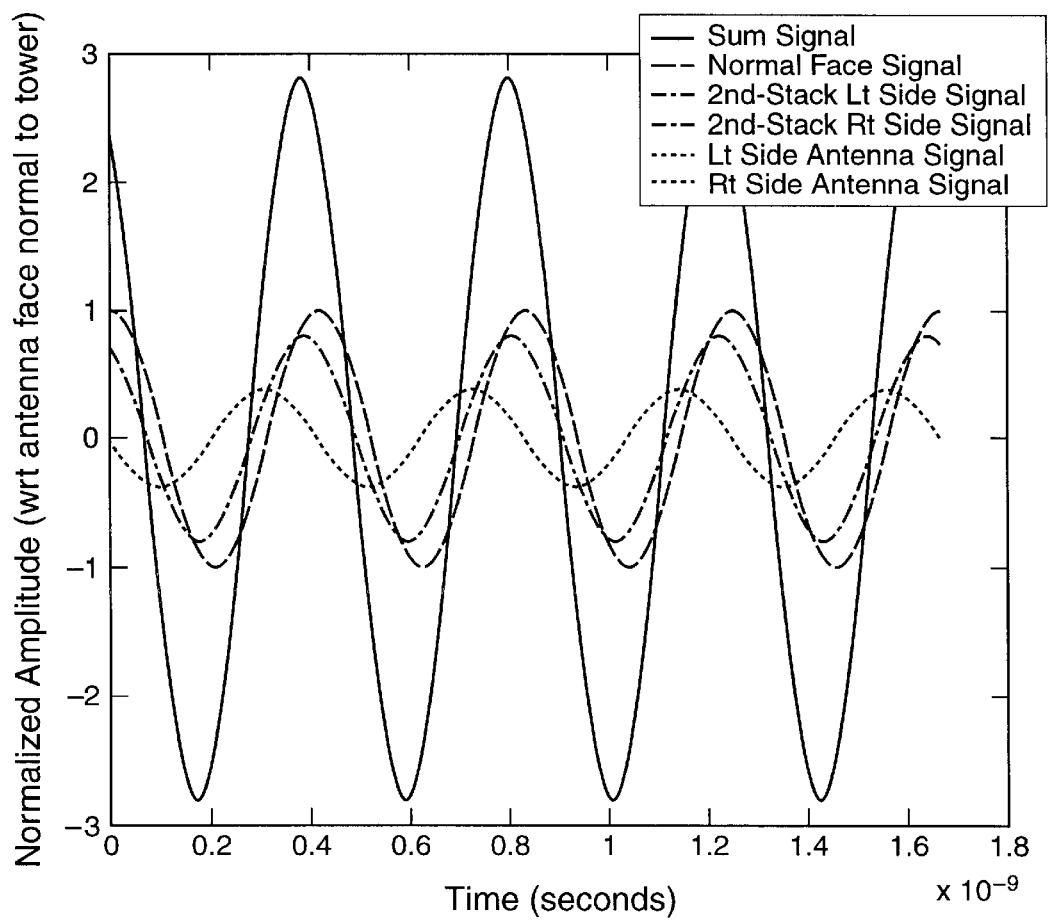
FIG. 6b shows a signal provement of 9.5 dB from the addition of the contributions from the several sides the antenna approximately facing the transmitter over the gain for a single face.

FIG. 6a is a graph of the gain-area product versus orientation for the six-sided stack antenna shown in FIG. 4. The figure compares the four sides that are adjacent to the normal-facing side in terms of both energy captured and energy redirected. Energy from all five sides, the normal-facing side and its four adjacent sides, is directed back to the carrier-transmit tower. The energy from all five sides combine in a constructive manner to increase the power of the signal observed at the tower. FIG. 6b shows a signal-power improvement of 9.5 dB from the addition of the contributions from the five sides of the antenna approximately facing the transmitter compared to just the signal-power for a single face. This includes the contribution from both stages of the antenna; that is, since the modulation is anticipated to include frequency-shift keying (FSK), it is possible to add the signals from all of the facets. The important factor in the reception of the data stream (binary or greater) is the frequency recovered over the bit-time interval and not the absolute phase of the signal. Assuming that the size of each modulated reflector facet is proportional to the wavelength in use, the phase shift among the five return reflections of greatest amplitude will be less than a quarter wavelength. Thus, the five signals will sum constructively in time because the phase difference between any pair of signals is less than 45°. Even though the four adjacent sides to the normal-facing sides collect less energy than the normal-facing side and their redirection of captured energy is biased away from the normal direction, the four sides still produce a positive contribution of significance.

Figure 7:
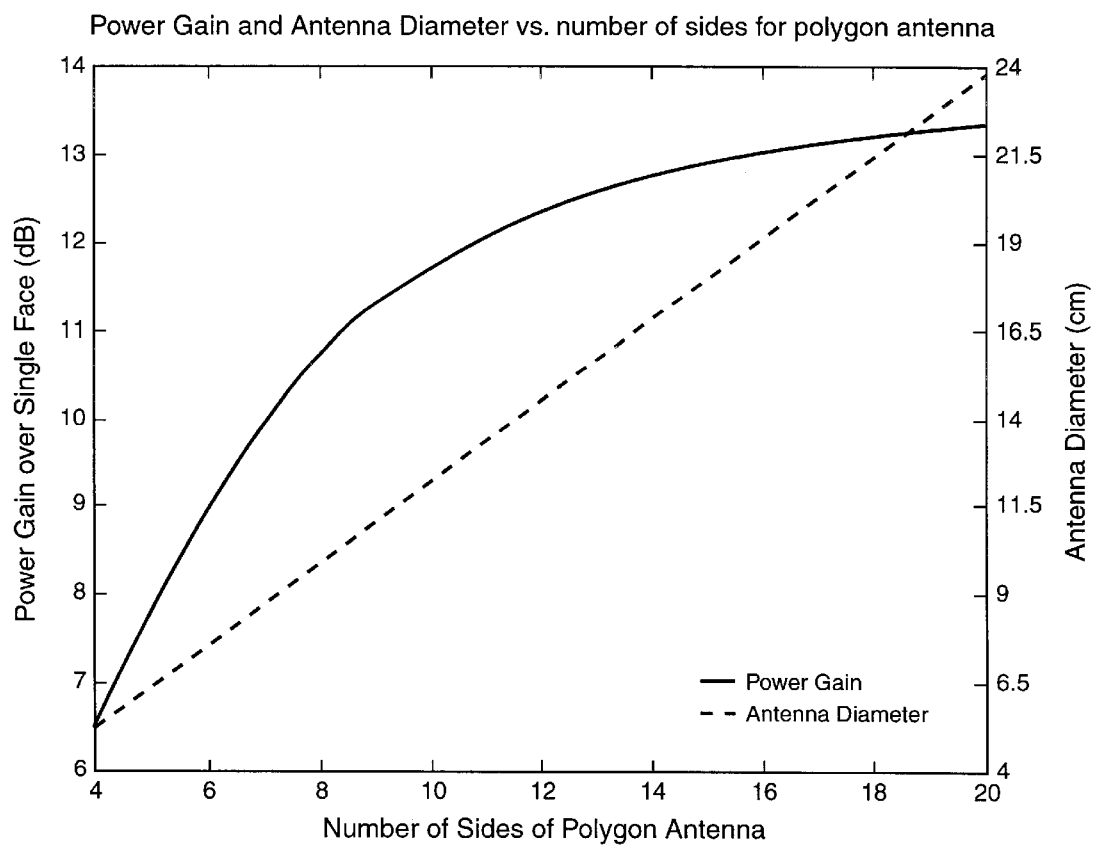
FIG. 7 is a graph of the gain and antenna diameter versus the number of sides of the polygon antenna shown in FIG. 4 hereof.

FIG. 7 is a plot of the power gain for multi-faceted polygonal antennas and the size of such antennas as a function of the number of sides of the antenna, assuming a patch size of 2.5 cm. As can be seen from the graph, the antenna diameter grows approximately linearly as the number of sides of the polygon increases, while the power gain grows rapidly initially and then experiences a more level rate of growth. Therefore, it appears that 6 to 8 sides is a reasonable compromise.

Figure 8:
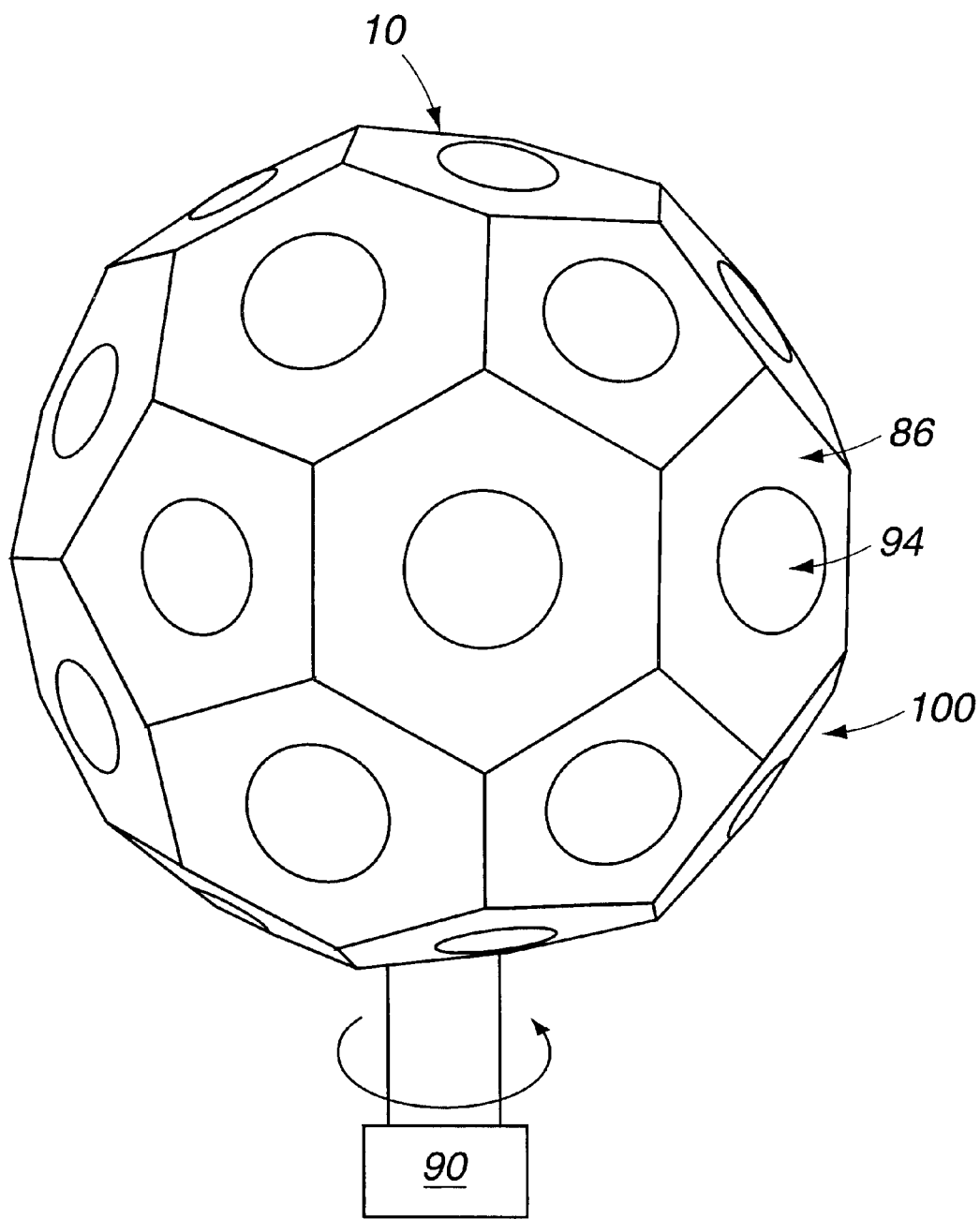
FIG. 8 is a schematic representation of a generally spherical embodiment of the antenna suitable for practicing the present invention, whereby the vertical orientation of the antenna becomes less important than that for the antenna shown in FIG. 4 hereof.

FIG. 8 is a schematic representation of a generally spherical embodiment of the antenna suitable for practicing the present invention, whereby the vertical orientation of the antenna becomes less important than that for the antenna shown in FIG. 4 hereof. Icosahedral configuration, 100, has at least one patch antenna 94 on each face 86, thereby permitting gain in a plurality of directions including gain away from a generally horizontal direction. Means 90 for rotating the approximately spherical antenna 10 are also shown in FIG. 4. Clearly, spherical configurations having fewer or greater than 20 faces are contemplated by the present invention.

The foregoing description of the invention has been presented for purposes of illustration and description and is not intended to be exhaustive or to limit the invention to the precise form disclosed, and obviously many modifications and variations are possible in light of the above teaching. For example, hi-temperature super conductors might be used in the base station receiving antenna for improving the signal-to-noise ratio of the received signal from the modulated signal of the cell-phone, thereby increasing the effective range of the cell-phone. Moreover, the use of voice compression and error-correcting coding in the cell-phone handset would provide for a lower bandwidth modulated signal (more range) with less error (distortion) over a greater distance. Since the current cell-phone market seems to be migrating to a CDMA (Code Division Multiple Access) based system, it is envisioned that the cell-phone system of the present invention would also utilized CDMA.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A radio communications system comprising in combination:
   (a) a stationary system which comprises:
      (i) means for generating an airborne carrier frequency;
      (ii) means for generating an airborne radio communication; and
      (iii) means for receiving and demodulating a modulated, reflected airborne carrier frequency; and
   (b) a mobile unit which comprises:
      (i) data input means capable of generating electrical signals;
      (ii) a passive transponder comprising:
         an antenna having gain in a plurality of directions for receiving the modulated carrier frequency; an impedance switch in electrical connection with said antenna for varying the impedance thereof; and means for receiving the electrical signals from said data input means and for varying the impedance of said impedance switch in response thereto, thereby modulating the carrier frequency by varying the reflectivity of said antenna to the carrier frequency;
      (iii) a radio receiver for receiving the airborne radio communication from said means for generating an airborne radio communication and generating electrical signals therefrom; and
      (iv) data output means in electrical connection with said radio receiver for receiving the electrical signals generated thereby and generating an observable signal therefrom; whereby two-way radio communication is established between said stationary unit and said mobile unit.

2. The radio communications system as described in claim 1, wherein said antenna comprises multiple facets, each facet being in electrical connection with said impedance switch such that the reflectivity of each of said facets is modulated thereby.

3. The radio communications system as described in claim 2, wherein the number of facets is between four and eight disposed about an axis of symmetry.

4. The radio communications system as described in claim 3, wherein each of said facets comprises at least one microstrip patch.

5. The radio communications system as described in claim 3, further comprising means for rotating said antenna about the axis of symmetry.

6. The radio communications system as described in claim 1, wherein said data input means comprises a microphone.

7. The radio communications system as described in claim 6, wherein said data output means comprises a speaker.

8. The radio communications system as described in claim 2, wherein the facets are arranged in the general form of a sphere.

9. The radio communications system as described in claim 8, wherein each of said facets comprises at least one microstrip patch.

10. The radio communications system as described in claim 8, further comprising means for rotating the sphere.

11. A radio communications system comprising in combination:
   (a) a stationary system which comprises:
      (i) means for generating an airborne carrier frequency having a first modulation thereon; and
      (ii) means for receiving and demodulating a reflected airborne carrier frequency having a first modulation and a second modulation thereon; and
   (b) a mobile unit which comprises:
      (i) data input means capable of generating electrical signals;
      (ii) a passive transponder comprising:
         an antenna having gain in a plurality of directions for receiving the carrier frequency having a first modulation thereon; an impedance switch in electrical connection with said antenna for varying the impedance thereof; means for receiving the electrical signals from said data input means and for varying the impedance of said impedance switch in response thereto, thereby imparting a second modulation to the carrier frequency having a first modulation thereon by varying the reflectivity of said antenna to the carrier frequency having a first modulation thereon;
      (iii) a radio receiver for receiving and demodulating the airborne carrier frequency having the first modulation thereon and generating electrical signals therefrom; and
      (iv) data output means in electrical connection with said radio receiver for receiving the electrical signals generated thereby and generating an observable signal therefrom; whereby two-way radio communication is established between said stationary unit and said mobile unit.

12. The radio communications system as described in claim 11, wherein said antenna comprises multiple facets, each facet being in electrical connection with said impedance switch such that the reflectivity of each of said facets is modulated thereby.

13. The radio communications system as described in claim 12, wherein the number of facets is between four and eight disposed about an axis of symmetry.

14. The radio communications system as described in claim 13, wherein each of said facets comprises at least one microstrip patch.

15. The radio communications system as described in claim 13, further comprising means for rotating said antenna about the axis of symmetry.

16. The radio communications system as described in claim 11, wherein said data input means comprises a microphone.

17. The radio communications system as described in claim 16, wherein said data output means comprises a speaker.

18. The radio communications system as described in claim 12, wherein the facets are arranged in the general form of a sphere.

19. The radio communications system as described in claim 18, wherein each of said facets comprises at least one microstrip patch.

20. The radio communications system as described in claim 18, further comprising means for rotating said spherical antenna.

* * * * *